United States Patent [19]

Trainor

[11] 4,134,472
[45] Jan. 16, 1979

[54] COMBINATION MUFFLER AND AIR FILTER

[76] Inventor: John B. Trainor, 2375 S. Commerce, Walled Lake, Mich. 48088

[21] Appl. No.: 828,744

[22] Filed: Aug. 29, 1977

[51] Int. Cl.$^2$ .............................................. F01N 1/24
[52] U.S. Cl. .................................. 181/258; 181/230; 181/243
[58] Field of Search ............... 181/229, 230, 231, 243, 181/247, 252, 256, 258, 282, 223; 55/225, 276

[56] References Cited

U.S. PATENT DOCUMENTS

| | | | |
|---|---|---|---|
| 1,857,845 | 5/1932 | Hamilton | 181/256 |
| 2,815,088 | 12/1957 | Gibel | 181/230 |
| 3,380,553 | 4/1968 | Gibel | 181/230 |
| 3,563,338 | 2/1971 | Rader | 181/243 |
| 3,811,251 | 5/1974 | Gibel | 181/230 |

Primary Examiner—L. T. Hix
Assistant Examiner—Benjamin R. Fuller
Attorney, Agent, or Firm—Adolph G. Martin

[57] ABSTRACT

A combination muffler and air filter, having a central tubular member with spaced longitudinally disposed elongated slots. A disposable canister on the central tubular member is removably held in position by retainer caps engaged on the ends of the central tubular member. One of the retainer caps is adapted for connection to the exhaust conductor from a pneumatically operated device or compressed air system. The other retainer cap has therein an annular sump, connected by lateral ducts to a drain opening. The disposable canister has a perforated cylinder encasing a series of stacked annular members having both muffling and filtering properties. A perforated sleeve in the disposable canister supportively engages the inner periphery of the stacked annular members. A closure disc, fixed on each of the perforated cylinders, holds the stacked annular members in a compact and compressed condition.

4 Claims, 14 Drawing Figures

FIG. 1
FIG. 2
FIG. 3
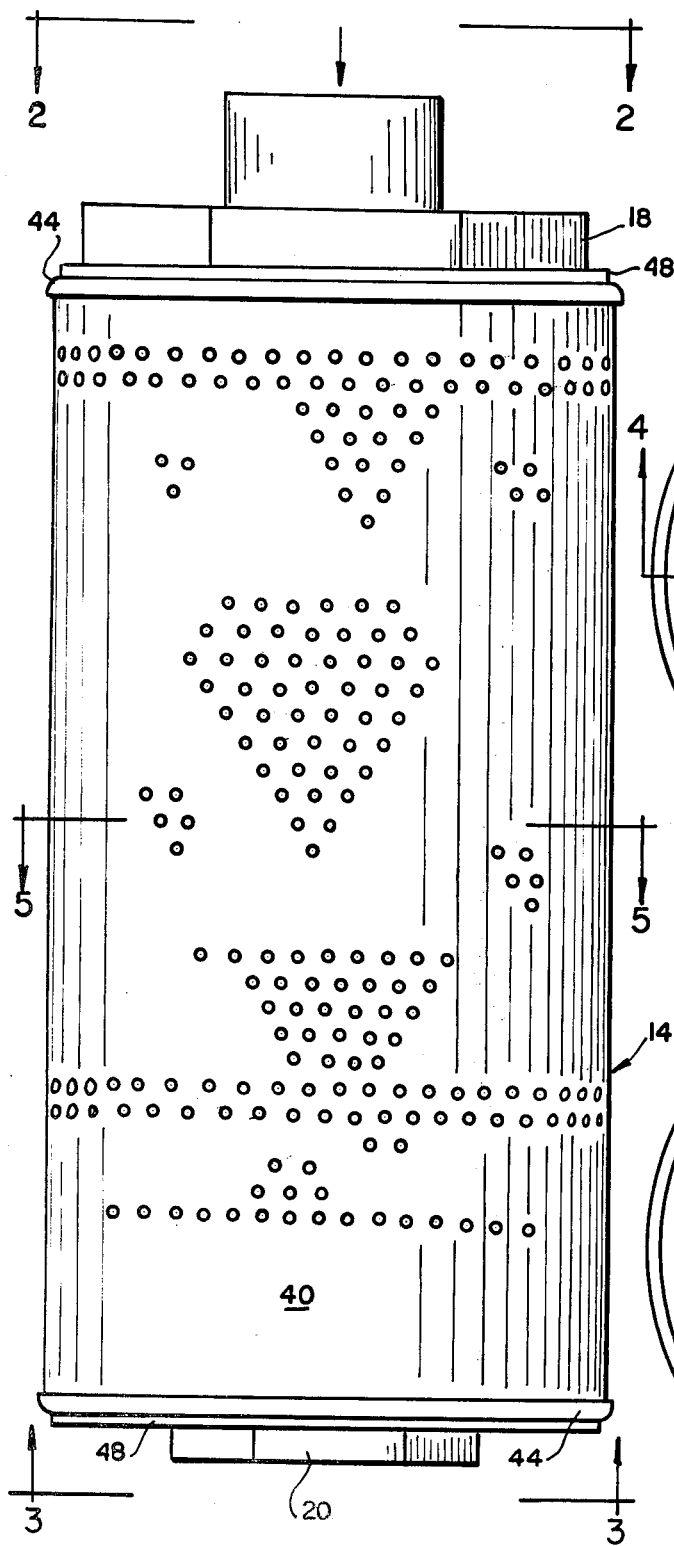
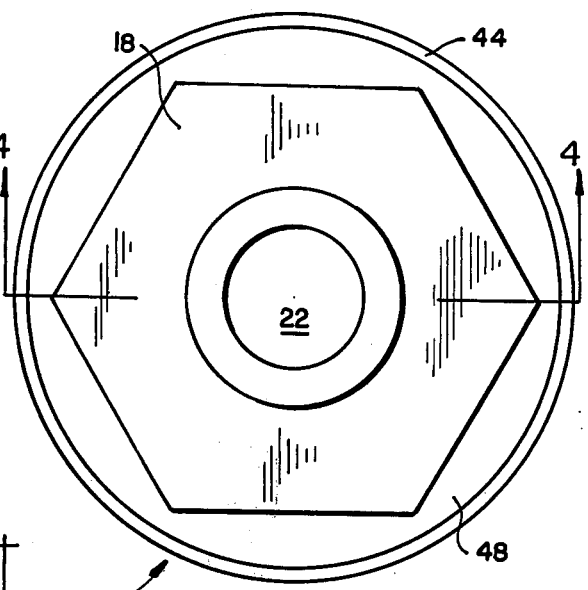
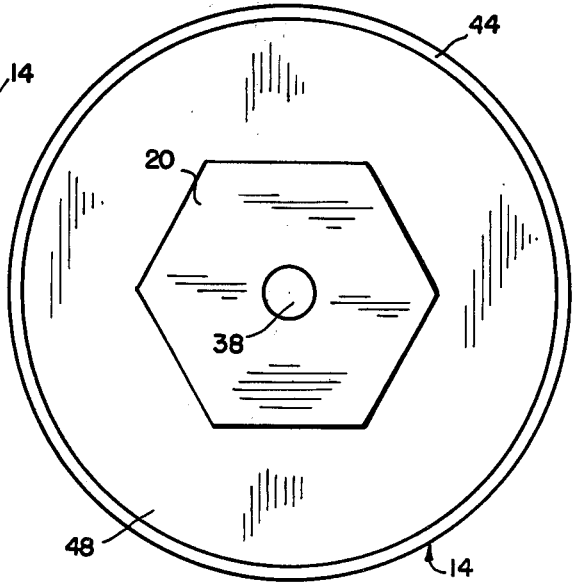

COMBINATION MUFFLER AND AIR FILTER

BACKGROUND OF THE INVENTION

This invention relates generally to devices for muffling and filtering air exhausted from pneumatically operated tools, equipment, and machines, such as hoists and presses. Many of the difficulties and malfunctions encountered in the operation of such compressed air operated devices are caused by excessive back or surge pressures resulting from faulty design or defects in the muffling and filtering units. Excessive pressures can cause explosions or re-cycling thereby damaging equipment and producing hazards to the safety of operating and maintenance personnel.

Fully cognizant of these dangers to both equipment and personnel, the applicant has developed a combination muffler and air filter which effectively prevents the occurrence of excessive discharge pressures in such pneumatically operated devices, machines, and compressed air systems generally. The applicant's combination muffler and air filter, also provides an effective means for removing entrained solid and liquid contaminants for the exhausted air before it is discharged to the atmosphere.

SUMMARY OF THE INVENTION

This invention consists of a central tubular member 10 having therein a series of spaced longitudinally disposed elongated slots 12. A disposable canister 14, on the central tubular member 10, is removably held in position by top and bottom retainer caps 18 and 20 respectively on the ends of the central tubular member 10. The top retainer cap 18 has an intake port 22 communicating with the central tubular member 10.

The bottom retainer cap 20 has therein an annular sump 34 connected by lateral ducts 36 with a central drain opening 38. The disposable canister 14 has a perforated cylinder 40 encasing a series of stacked annular members 42, of felt or other suitable filtering materials. A perforated sleeve 50 in the disposable canister 14 supportively engages the inner periphery of the stacked annular members 42. A closure disc 44, fixed on each end of the perforated cylinder 40, holds the stacked annular members 42 in a compact and compressed condition.

DESCRIPTION OF THE DRAWINGS

FIG. 1 is an elevation view of a combination muffler and air filter constituting the preferred embodiment of the applicant's invention.

FIG. 2 is a top plan view, taken substantially on plane 2—2 in FIG. 1, showing the characteristic shape of the top retainer cap 18.

FIG. 3 is a bottom plan view, taken substantially on plane 3—3 in FIG. 1, showing the threaded drain opening 38 in the bottom retainer cap 20.

CONSTRUCTION

Figure 4:
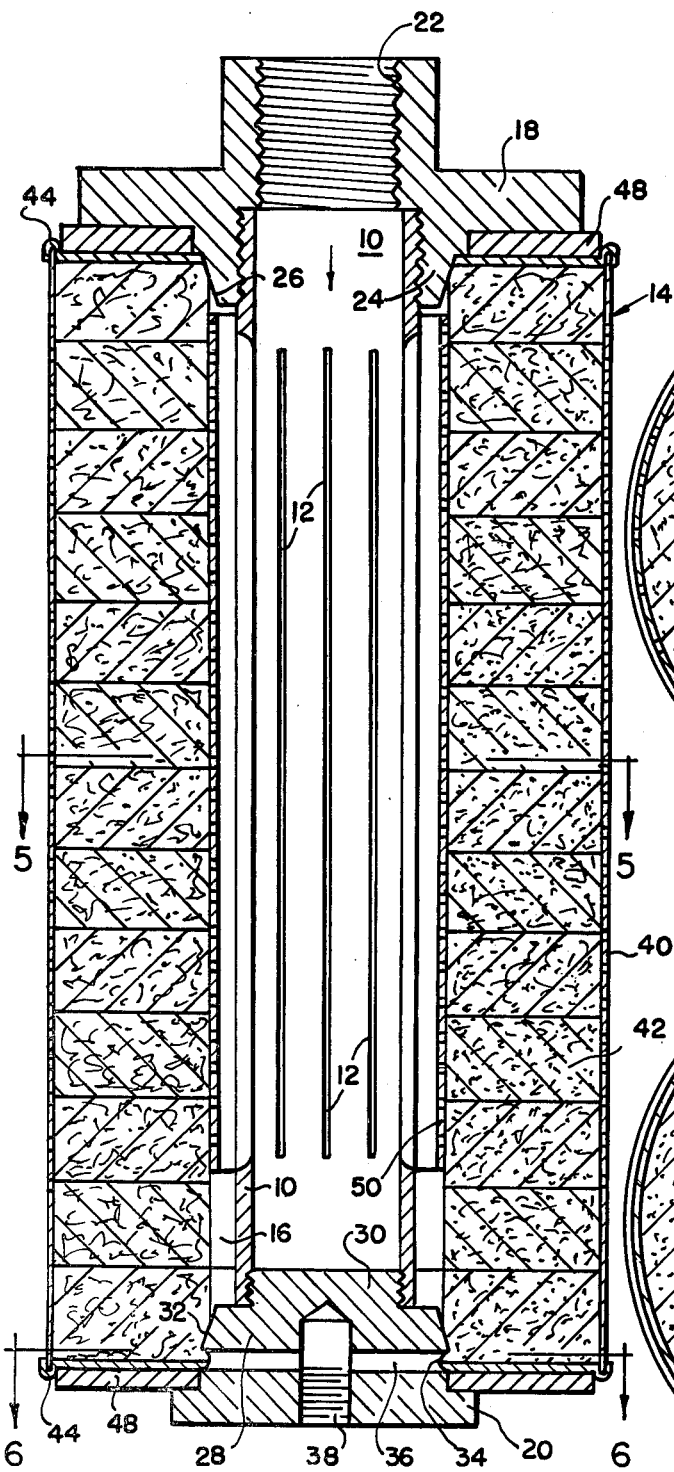
FIG. 4 is a section view, taken substantially on plane 4—4 in FIG. 2, showing structural details of the various components.
Figure 5:
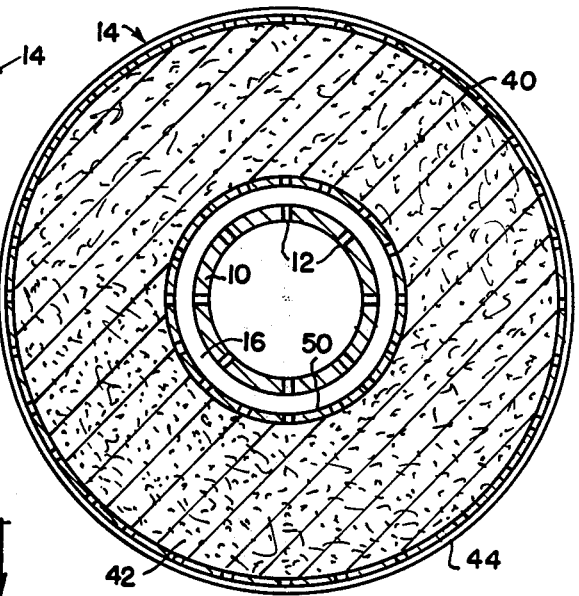
FIG. 5 is a section view, taken substantially on plane 5—5 in FIG. 1, showing disposition of the longitudinally disposed elongated slots 12 in the central tubular member 10.
Figure 6:
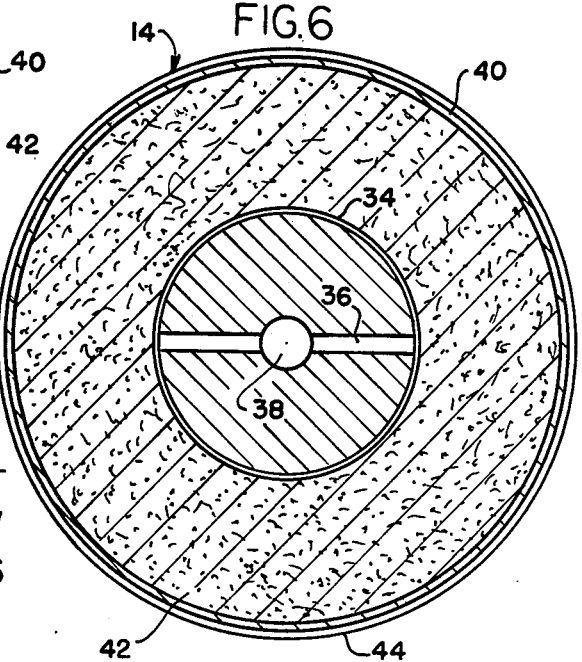
FIG. 6 is a section view, taken substantially on plane 6—6 in FIG. 4, showing the lateral ducts 36 and the annular sump 34 in the bottom retainer cap 20.
Figure 7:
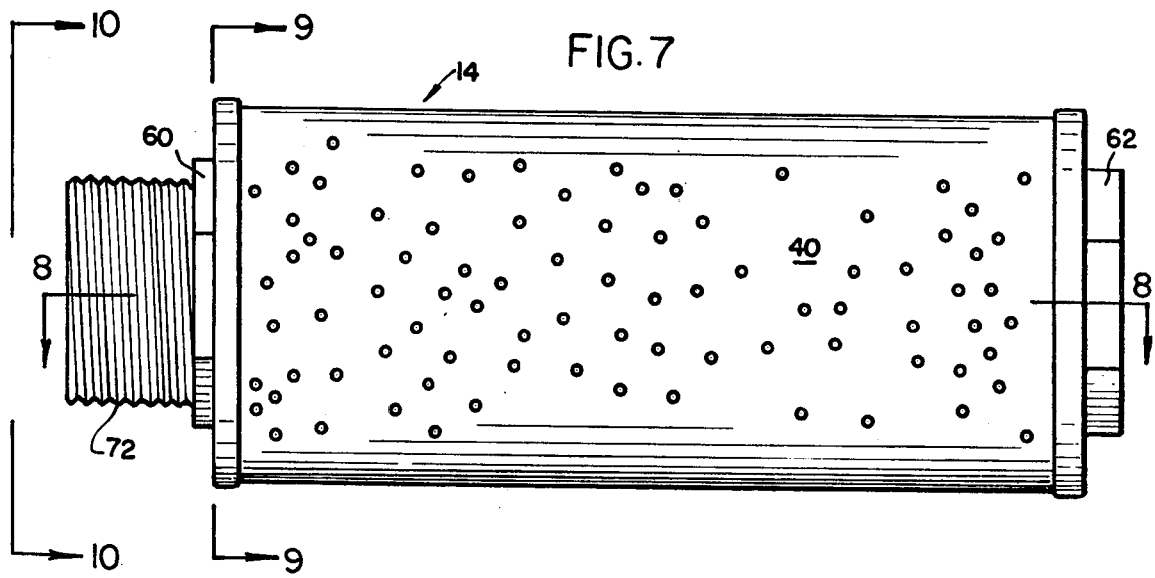
FIG. 7 is a side elevation view showing a modification of the applicant's invention.
Figure 8:
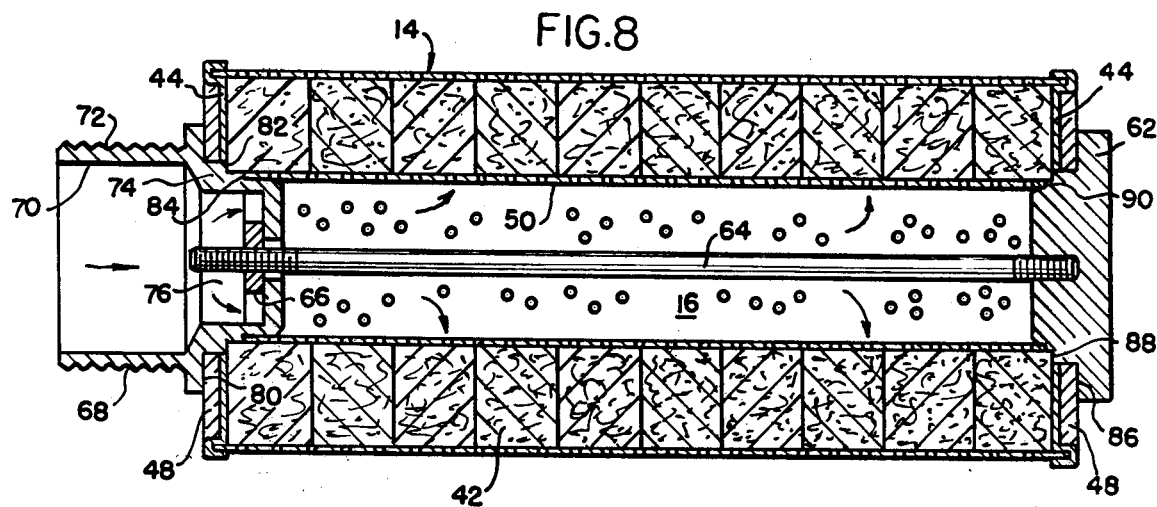
FIG. 8 is a section view, taken substantially on plane 8—8 in FIG. 7, showing structural details of the various components.
Figure 9:
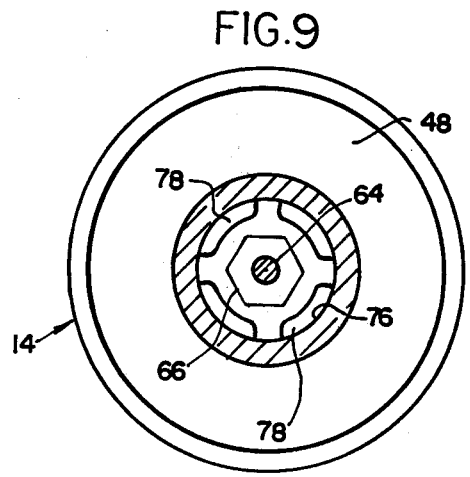
FIG. 9 is a section view, taken substantially on plane 9—9 in FIG. 7, showing structural details of the front retainer cap 60.
Figure 10:
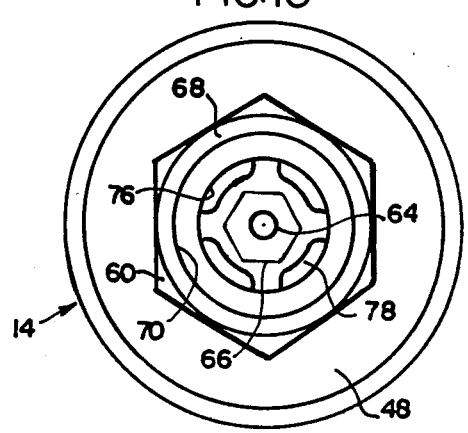
FIG. 10 is an end elevation view, taken substantially on plane 10—10 in FIG. 7, showing the characteristic shape of the front retainer cap 60.

For a detailed description of the preferred embodiment of the applicant's invention, reference is made to FIG. 1 through 6 of the drawings, in which numeral 10 designates a central tubular member having therein spaced longitudinally disposed elongated slots 12 having a combined area equal to that of the cross section on the tubular member 10. A disposable canister 14, having therethrough an axial opening 16, is located on the central tubular member 10, and removably held in its assigned position by top and bottom retainer caps 18 and 20 respectively.

The top retainer cap 18 is threadably attached to the upper end of the central tubular member 10, and has an internally threaded intake port 22. A downwardly disposed projection 24, on the lower end of the top retainer cap 18, has an inwardly tapered section 26 extending into the axial opening 16 of the disposable canister 14. The bottom retainer cap 20 has thereon an upwardly disposed projection 28 with a terminal plug 30 threadably engaged in the lower end of the central tubular member 10.

An inwardly tapered section 32, on the upwardly disposed projection 28, extends into the axial opening 16, and has therearound an annular channel sump 34. Two lateral ducts 36, in the bottom retainer cap 20, connect the annular channel sump 34 to an internally threaded central drain opening 38. The disposable canister 14 has a perforated cylinder 40 containing stacked annular members 42, of felt or other suitable material, having satisfactory muffling and filtering properties.

A closure disc 44 on each end of the perforated cylinder 40 is permanently attached thereto, by crimping or other satisfactory means, and holds the stacked annular members 42 in a compact and compressed condition. The stacked annular members 42 seatably engage the tapered sections 26 and 32 on the top and bottom retainer caps 18 and 20 respectively. A flat washer 48 is forceably held in intimate contact with each of the closure discs 44 by the top and bottom retainer caps 18 and 20 respectively. A perforated sleeve 50 in the disposable canister 14 supportively engages the inner periphery of the stacked annular members 42.

FIGS. 7 through 10 discloses a modification of the applicant's invention in which the disposable canister 14 has a front retainer cap 60 and a rear retainer cap 62 both seated on a flat washer 48 bearing on the closure discs 44 of the perforated cylinder 40. A tie rod 64 is threadably engaged at one end in the rear retainer cap 62, and has on the other end thereof a detachable nut 66. A tubular extension 68, on the front retainer cap 60, provides an intake port 70 and has thereon an externally end section 72.

A rearwardly disposed projection 74 on the front retainer cap 60 has therein a cylindrical chamber 76, and an annular array of four spaced discharge ports 78 in communication with the intake port 70 of the tubular extension 68. A series of three longitudinally spaced shoulders 80, 82 and 84, on the periphery of the rearwardly disposed projection 74, provide annular seats for the flat washer 48 and the stacked annular members 42 and the perforated sleeve 50 respectively in the disposable canister 14.

Three longitudinally spaced annular shoulders 86, 88 and 90 on the rear retainer cap 62 provide seats for the flat washer 48 and the stacked annular members 42 and perforated sleeve 50 respectively in the disposable canister 14. FIGS. 11 through 14 disclose a further modification of the applicant's invention especially adapted for use with conventional pneumatic hand tools such as drills and grinders.

Figure 11:
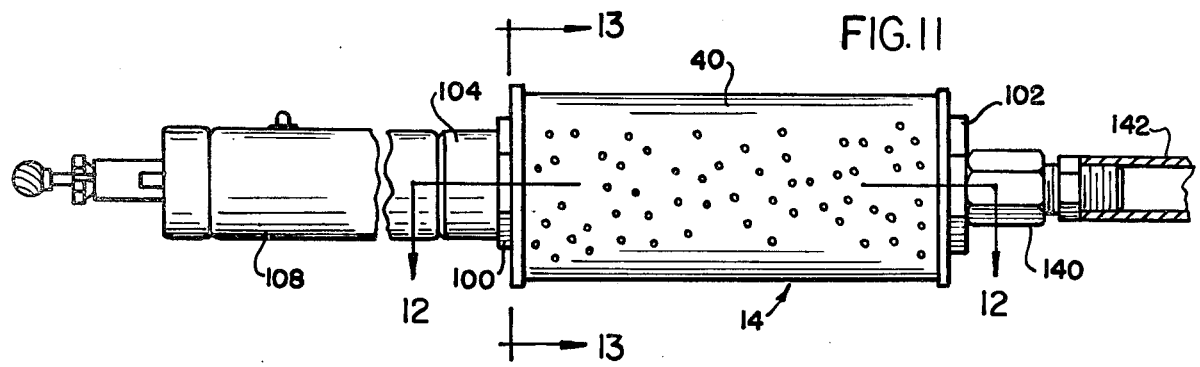
FIG. 11 is a side elevation view, showing a further modification of the applicant's invention, for use with conventional pneumatic hand tools.
Figure 12:
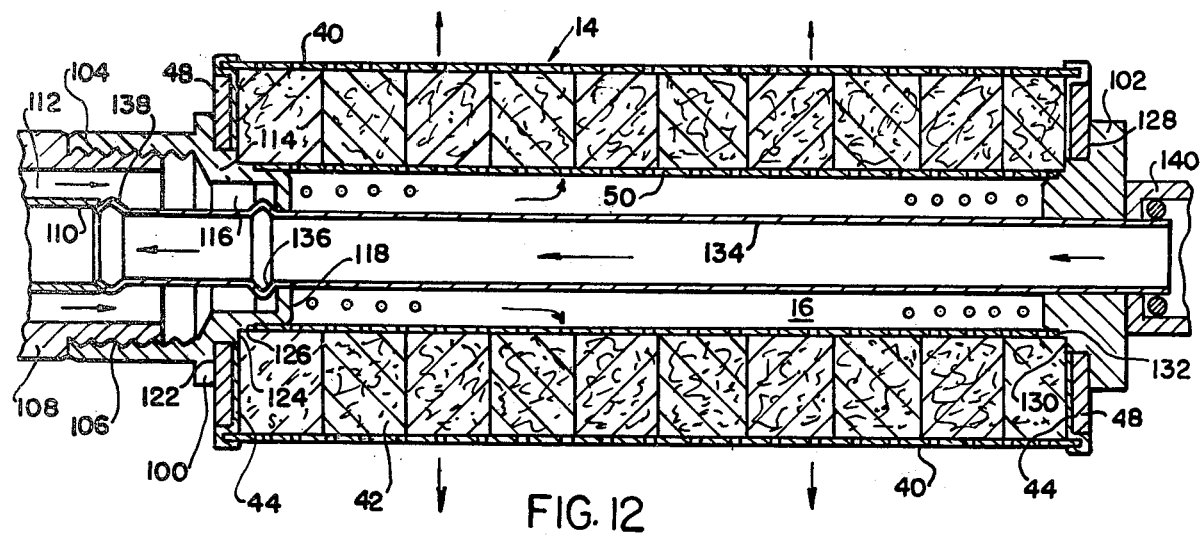
FIG. 12 is a section view, taken substantially on plane 12—12 in FIG. 11, showing structural details of the various components.
Figure 13:
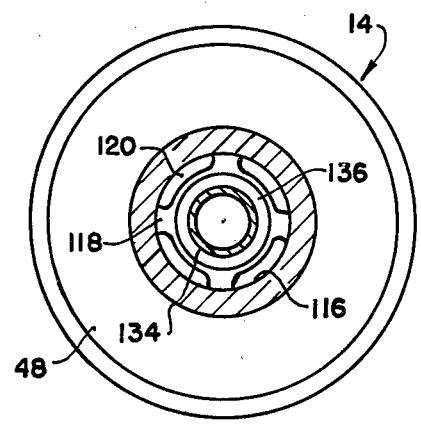
FIG. 13 is a section view, taken substantially on plane 13—13 in FIG. 11, showing internal construction of the front retainer cap 100.

In this embodiment the disposable canister 14 has a front and a rear retainer cap 100 and 102 respectively, seated on flat washers 48 bearing directly on the closure discs 44 of the perforated cylinder 40. A tubular extension 104 on the front retainer cap 100 has an internally threaded section 106 for detachably engaging the connector on a conventional pneumatic tool 108 as shown in FIGS. 11 and 12. An intake tube 110 in the tool 108, for receiving compressed air with which to operate the unit, has therearound an annular exhaust chamber 112.

A rearwardly disposed projection 114 on the front retainer cap 100 contains a cylindrical chamber 116 with a back wall 118 having therein four spaced discharge ports 120 providing communication between the annular exhaust chamber 112 in the pneumatic tool 108 and the axial opening 16 through the canister 14. A series of three longitudinally spaced shoulders 122, 124 and 126, on the periphery of the rearwardly disposed projection 114, provide annular seats for the flat washer 48 and the stacked annular members 42 and perforated sleeve 50 respectively in the disposable canister 14.

Three longitudinally spaced annular shoulders 128, 130 and 132, on the rear retainer cap 102, provide seats for the flat washer 48 and the stacked annular members 42 and perforated sleeve 50 respectively at the other end of the disposable canister 14, extends slidably through both the front and rear retainer caps 100 and 102 respectively. An annular shoulder 136, on the forward portion of the central tubular member 134, is seated on the back wall 118 of the cylindrical chamber 116.

Figure 14:
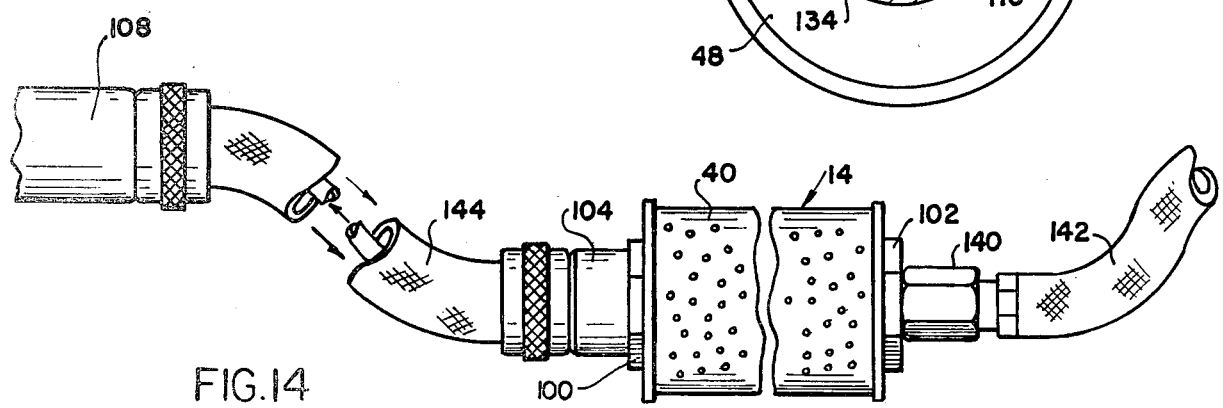
FIG. 14 is a side elevation view, with a portion of the two-way flexible tubing 142 cut away, showing the combination muffler and air filter of FIG. 11 connected to provide a remote exhaust for a pneumatic hand tool 108.

A terminal enlargement 138, on the forward end of the central tubular member 134, sealably engages the end of the intake tube 110 in the pneumatic tool 108 as shown in FIG. 12. A connector 140 on a flexible hose 142 detachably engages the other end of the central tubular member 134. In the event it is desired to provide a remote discharge for the pneumatic tool 108, a two-way flexible hose 144 is inserted between the applicant's combination muffler and filter and the pneumatic tool 108, as shown in FIG. 14.

This completes a description of the structure comprising and characterizing the several embodiments of the applicant's invention herein disclosed; however, to facilitate a more thorough and comprehensive understanding of the subject matter, a discussion of the manner in which the device is used and operates to fulfill its intended function is immediately hereinafter set forth.

USE AND OPERATION

Since the various embodiments of the applicant's invention all function in substantially the same manner, the discussion of use and operation will be limited to the embodiment disclosed in FIGS. 1 through 6 of the drawings, which is especially adapted for use in connection with compressed air systems generally, as contrasted with the embodiment in FIGS. 11 through 14, which was especially designed for use exclusively with pneumatic tools.

In use, the internally threaded intake port 22 is connected to receive the exhaust air discharged from a compressed air operated system. The threaded drain opening 38 is likewise connected by conventional means to a collector tank not here shown. When the exhaust air, containing solid and liquid contaminants, enters the intake port 22, it is conducted downward to the central tubular member 10. It then passes laterally through the spaced vertically disposed elongated slots 12 and enters the stacked annular members 42 through the perforated sleeve 50.

In passing through the stacked annular members 42, the entrained solids and liquids are removed before the air reaches the perforated cylinder 40 where it escapes to the atmosphere. All liquid contaminants removed from the exhaust air gravitate to the annular sump 34 and flow through the lateral ducts 36 to the drain opening 38, where they are handled by conventional means well known in the art. Most of the solid contaminants removed from the exhaust air remain trapped in the stacked annular members 42, and eventually reduce the operating efficiency to an unacceptable level.

The disposable canister 14 is then removed by threadably disengaging the top retainer cap 18 from the central tubular member 10. The disposable canister 14 is then discarded and replaced by a new unit whereupon the device is again capable of operating effectively in removing entrained solid and liquid contaminants in the exhaust received from compressed air operated systems. The effectiveness of the applicant's device is preventing excessive back and surge pressures is primarily a result of the laminar construction which characterizes the muffling and filtering media consisting of the stacked annular members 42.

Whenever pressures within the canister 14 reach a pre-selected magnitude, the stacked annular members 42 will separate sufficiently to allow discharge directly from the central tubular member 10 to the atmosphere. Pressure within the canister 14 and the exhaust portion of the system is thereby prevented from reaching a dangerous and explosive level. The space provided around the central tubular member 10 further enhances the effectiveness of the applicant's device in preventing excessive back and surge pressures, by allowing the exhaust air to circulate before it passes through the perforated sleeve 50 and enters the stacked annular members 42 thereby equalizing the pressure within the canister 14.

The ample space provided around the central tubular member 10 also serves to lower the discharge pressure so that the velocity of the exhaust air when it reaches the atmosphere is reduced sufficiently to prevent metal chips and other solids present in the immediate area from being blown about thereby endangering the person and general health of the workers.

Based upon the foregoing discussion, the applicant is of the opinion that his invention has fulfilled a long-felt need in the field of mufflers and air filters, and that he has accordingly made a valuable contribution to the related art. The invention, however, was described with reference to the structural details relating to a limited number of embodiments, but it will be appreciated by those familiar with the art that the principles involved are susceptible of numerous other practical adaptations.

I therefore claim as new, and desire to secure by Letters Patent:

1. A combination muffler and air filter comprising a canister having therethrough an axial opening, such canister including a perforated cylinder, annular members with muffling and filtering properties stacked in the perforated cylinder, and a closure disc on each end of the perforated cylinder compressably holding the annular members in the perforated cylinder, a retainer cap on each end of the canister, an intake port in one of the retainer caps in communication with the axial opening through the canister, a tubular member centrally disposed in the axial opening through the canister and threadably engaged on each end in the retainer caps, and a plurality of longitudinally disposed slots in the tubular member.

2. The combination muffler and air filter of claim 1 having an addition thereto a perforated sleeve supportively engaging the inner periphery of the annular members stacked in the perforated cylinder of the canister.

3. The combination muffler and air filter of claim 2 in which the other retainer cap has therein an annular sump and a drain opening in communication with the annular sump.

4. The combination muffler and air filter of claim 3 in which the drain opening communicates with the annular sump through spaced lateral ducts.

* * * * *